United States Patent
Leduc et al.

(10) Patent No.: US 11,261,087 B2
(45) Date of Patent: Mar. 1, 2022

(54) METHOD FOR PREPARING LITHIUM BIS(FLUOROSULPHONYL)IMIDE SALT

(71) Applicant: Arkema France, Colombes (FR)

(72) Inventors: Philippe Leduc, Pierre-Benite (FR); Dominique Deur-Bert, Pierre-Benite (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/056,781

(22) PCT Filed: May 21, 2019

(86) PCT No.: PCT/FR2019/051148
§ 371 (c)(1),
(2) Date: Nov. 19, 2020

(87) PCT Pub. No.: WO2019/224470
PCT Pub. Date: Nov. 28, 2019

(65) Prior Publication Data
US 2021/0122634 A1     Apr. 29, 2021

(30) Foreign Application Priority Data
May 23, 2018 (FR) ...................................... 1854313

(51) Int. Cl.
*C01B 21/093* (2006.01)
*B01D 47/02* (2006.01)

(52) U.S. Cl.
CPC ............ *C01B 21/093* (2013.01); *B01D 47/02* (2013.01); *B01D 2251/106* (2013.01); *B01D 2251/108* (2013.01); *B01D 2251/502* (2013.01); *B01D 2251/506* (2013.01); *B01D 2257/80* (2013.01)

(58) Field of Classification Search
CPC .......... B01D 2251/106; B01D 2257/80; B01D 2257/2027; B01D 53/507; B01D 2251/502; B01D 47/02; B01D 53/68; B01D 2251/108; B01D 2251/506; H01M 10/052; H01M 10/0568; Y02E 60/10; C01B 21/093; C01B 21/086
See application file for complete search history.

(56) References Cited

U.S. PATENT DOCUMENTS

| | | | |
|---|---|---|---|
| 9,650,250 B2 * | 5/2017 | Maruyama | ............ C01B 21/093 |
| 2014/0075746 A1 | 3/2014 | Schmidt | |
| 2015/0175422 A1 | 6/2015 | Maruyama | |
| 2015/0246812 A1 | 9/2015 | Audureau et al. | |
| 2017/0047607 A1 | 2/2017 | Schmidt et al. | |
| 2021/0214220 A1 * | 7/2021 | Schmidt | ............ H01M 10/0568 |

FOREIGN PATENT DOCUMENTS

| | | | | |
|---|---|---|---|---|
| CN | 106 006 586 A | * | 10/2016 | ........... C01B 21/086 |
| EP | 2881365 A1 | | 6/2015 | |
| WO | WO 2012/160280 A2 | | 11/2012 | |
| WO | WO 2014/080120 A1 | | 5/2014 | |
| WO | WO 2015/158979 A1 | | 10/2015 | |

OTHER PUBLICATIONS

U.S. Appl. No. 17/056,441, Schmidt et al.
International Search Report (PCT/ISA/210) and Written Opinion (PCT/ISA/237) dated Sep. 9, 2019, by the European Patent Office as the International Searching Authority for International Application No. PCT/FR2019/051149, European Patent Office, Rijswijk, NL, 15 pages.
Schmidt, Grégory, et al., U.S. Appl. No. 17/056,441 entitled "Method for Preparing an Imide Salt Containing a Fluorosulphonyl Group," filed in the U.S. Patent and Trademark Office on Nov. 18, 2020.
International Search Report (PCT/ISA/210) dated Aug. 2, 2019, by the European Patent Office as the International Searching Authority for International Application No. PCT/FR2019/051148.
Written Opinion (PCT/ISA/237) dated Aug. 2, 2019, by the European Patent Office as the International Searching Authority for International Application No. PCT/FR2019/051148.
Beran, M., et al., "A New Method of the Preparation of Imidobis(sulfuric acid) Dihalogenide,(F,Cl), and the Potassium Salt of Imido-bis(sulfuric acid) Difluoride", Z. Anorg. Allg. Chem., vol. 631, 2005, pp. 55-59.
Lehner, M., et al., "Separation of Dust, Halogen and PCDD/F in a Compact Wet Scrubber", Trans Icheme, vol. 79B, Mar. 2001, pp. 109-116.
Roy, P., et al., "Emission Control and Finding a Way Out to Produce Sulphuric Acid from Industrial SO2 Emission", J Chem Eng Process Technol, vol. 6, No. 2, 2015.

* cited by examiner

*Primary Examiner* — Timothy C Vanoy
(74) *Attorney, Agent, or Firm* — Buchanan Ingersoll & Rooney P.C.

(57) ABSTRACT

A method for preparing $Cl-SO_2NHSO_2Cl$ including a step of chlorinating sulphamic acid with at least one chlorinating agent and at least one sulphur-containing agent, the method resulting in a flow F1, preferably liquid, including $Cl-SO_2NHSO_2Cl$ and a gas stream F2 including HCl and $SO_2$, the method including a step a) of treating the gas stream F2. Also, a method for preparing LiFSI including the abovementioned method for preparing $Cl-SO_2NHSO_2Cl$.

17 Claims, No Drawings

METHOD FOR PREPARING LITHIUM BIS(FLUOROSULPHONYL)IMIDE SALT

FIELD OF THE INVENTION

The present invention relates to a process for the preparation of lithium salt of imides containing a fluorosulfonyl group.

TECHNICAL BACKGROUND

Anions of sulfonylimide type, due to theft very low basicity, are increasingly used in the field of energy storage in the form of inorganic salts in batteries, or of organic salts in supercapacitors or in the field of ionic liquids. Since the battery market is booming and the reduction of battery manufacturing costs is becoming a major issue, a large-scale, low-cost synthesis process for anions of this type is required.

In the specific field of Li-ion batteries, the salt currently most widely used is $LiPF_6$, but this salt shows numerous disadvantages, such as a limited thermal stability, a sensitivity to hydrolysis and thus a lower battery safety. Recently, new salts possessing the $FSO_2^-$ group have been studied and have demonstrated numerous advantages, such as a better ion conductivity and a resistance to hydrolysis. One of these salts, LiFSl ($LiN(FSO_2)_2$), has shown highly advantageous properties which make it a good candidate for replacing $LiPF_6$.

Several processes exist for the preparation of LiFSl, comprising in particular a chlorination stage. However, these processes result in the release of toxic products, which might be discharged to the atmosphere and thus would have a negative impact on the environment.

There thus still exists a need for a process for the preparation of lithium bis(fluorosulfonyl)imide salt not exhibiting the abovementioned disadvantages.

In particular, there exists a need for a process for the preparation of lithium bis(fluorosulfonyl)imide salt which is more environmentally friendly and/or which is profitable economically.

DESCRIPTION OF THE INVENTION

The present invention relates to a process for the preparation of $Cl$—$SO_2NHSO_2Cl$ comprising a stage of chlorination of sulfamic acid with at least one chlorinating agent and at least one sulfur-containing agent, said process resulting in a stream F1, preferably liquid, comprising $Cl$—$SO_2NHSO_2Cl$ and a gas stream F2 comprising HCl and $SO_2$, said process comprising a stage a) of treatment of the gas stream F2.

The treatment stage a) advantageously makes it possible to avoid the rejection of HCl and $SO_2$, contained in the gas stream F2, to the atmosphere.

This stage a) of treatment of the gas stream F2 preferably comprises a stage of bringing said stream F2 into contact with an alkaline aqueous solution, and/or a stage of bringing said stream F2 into contact with a hydrogen peroxide solution, and/or a stage of separation of HCl and $SO_2$ contained in said stream F2, and/or a stage of absorption of HCl contained in said gas stream F2 in an aqueous solution, and/or a stage of absorption of $SO_2$ contained in said gas stream F2 in a concentrated sulfuric acid solution.

According to one embodiment, the gas stream F2 comprises:

more than 20% by weight of HCl, preferably more than 30% by weight of HCl and advantageously more than 40% by weight of HCl; and/or
more than 30% by weight of $SO_2$, preferably more than 40% by weight of $SO_2$ and advantageously more than 50% by weight of $SO_2$.

The gas stream F2 can optionally comprise one or more inert gas(es), such as, for example, nitrogen, helium or argon. It/they can, for example, be the inert gas(es) used in the abovementioned chlorination stage.

The stream F1 can optionally comprise the chlorinating agent, such as, for example, $SOCl_2$, for example in a content by weight of less than 5% by weight, preferentially of less than 1% by weight and advantageously of less than 0.5% by weight, with respect to the total weight of said stream F1.

The stream F1 can optionally comprise the sulfur-containing agent, such as, for example, $H_2SO_4$, for example in a content by weight of less than 5% by weight, preferentially of less than 1% by weight and advantageously of less than 0.5% by weight, with respect to the total weight of said stream F1.

The stream F1 can optionally comprise the chlorinating agent and the sulfur-containing agent, such as, for example, $SOCl_2$ and $H_2SO_4$, for example in a total content by weight of less than 5% by weight, preferentially of less than 1% by weight and advantageously of less than 0.5% by weight, with respect to the total weight of said stream F1.

The stream F1 can optionally comprise HCl and/or $SO_2$, each in a content preferably of less than 5% by weight, preferentially of less than 1% by weight and advantageously of less than 0.5% by weight, with respect to the total weight of said stream F1.

Treatment: Bringing into Contact with an Alkaline Aqueous Solution

According to a first embodiment, stage a) of treatment of the gas stream F2 comprises i) bringing the gas stream F2 into contact with an alkaline aqueous solution.

The alkaline aqueous solution can be an aqueous solution of an alkali metal or alkaline earth metal hydroxide or an aqueous solution of an alkali metal or alkaline earth metal carbonate.

Preferably, the alkaline aqueous solution is chosen from an aqueous solution of sodium hydroxide, of potassium hydroxide, of calcium hydroxide, of magnesium hydroxide, of calcium carbonate, of potassium carbonate, and their mixtures.

The alkaline aqueous solution can be prepared by dissolution of at least one alkali metal or alkaline earth metal base in water.

Preferably, the contacting operation i) is carried out in a neutralization column, in particular operating countercurrentwise.

The neutralization column can comprise:
at least one packing, such as, for example, a random packing and/or a stacked packing,
and/or
trays, such as, for example, perforated trays, fixed valve trays, movable valve trays, bubble cap trays or their combinations.

According to one embodiment, there is good reason to control the pH of the alkaline aqueous solution, so that it remains basic during stage i) of bringing into contact in the neutralization column.

According to one embodiment, the gas stream F2 is introduced at the bottom of the neutralization column, while the alkaline aqueous solution is introduced at the top of said column.

According to one embodiment, stage i) of bringing the gas stream F2 into contact, in particular in a neutralization column, with an alkaline aqueous solution makes it possible to form and to recover:

a gas stream G1 comprising water and optionally one or more inert gas(es), preferably recovered at the neutralization column top; and an alkaline stream L1 comprising water, Cl⁻ ions and sulfite $SO_3^{2-}$ ions, preferably recovered at the neutralization column bottom, L1 preferably being a liquid stream.

The alkaline stream L1 can optionally be directed to a waste water treatment plant, before optional discharge to the environment.

Treatment: Bringing into Contact with a Hydrogen Peroxide Solution

According to a second embodiment, stage a) of treatment of the gas stream F2 comprises ii) bringing the gas stream F2 into contact with a hydrogen peroxide solution.

The $SO_2$ contained in the gas stream F2 can then react with the hydrogen peroxide to quantitatively form sulfuric acid according to the reaction equation:

$$SO_2 + H_2O_2 \rightarrow H_2SO_4$$

Preferably, the contacting operation ii) is carried out in a scrubbing column, in particular operating countercurrentwise.

The hydrogen peroxide solution can be an aqueous solution, the content by weight of hydrogen peroxide of which ranges from 5% to 70% by weight, preferably from 5% to 50% by weight and advantageously from 5% to 35% by weight.

The molar ratio of the hydrogen peroxide/$SO_2$ contained in the gas stream F2 can range from 1 to 25, preferably from 1 to 20 and preferentially from 1 to 15.

The scrubbing column can comprise:

at least one packing, such as, for example, a random packing and/or a stacked packing, and/or trays, such as, for example, perforated trays, fixed valve trays, movable valve trays, bubble cap trays or their combinations.

According to one embodiment, the gas stream F2 is introduced at the bottom of the scrubbing column, while the hydrogen peroxide solution is introduced at the top of said column.

According to one embodiment, stage ii) of bringing the gas stream F2 into contact, in particular in a scrubbing column, with a hydrogen peroxide solution makes it possible to form and to recover:

a gas stream G2 comprising water and optionally one or more inert gas(es), preferably recovered at the scrubbing column top; and an acid stream L2 comprising water, HCl and $H_2SO_4$, preferably recovered at the scrubbing column bottom, said stream L2 preferably being a liquid stream.

According to one embodiment, at least 90% by weight, preferably at least 95% by weight, preferentially at least 99% by weight and advantageously at least 99.9% by weight of HCl contained in the gas stream F2 is recovered in the acid stream L2.

The abovementioned stage a) can comprise an additional stage ii-1) of treatment of the acid stream L2 which comprises bringing said acid stream L2 into contact with an alkaline aqueous solution, or an additional stage ii-2) of separation of HCl and of $H_2SO_4$ contained in the acid stream L2 in order to form and to recover a stream F3 comprising HCl and a stream F'3 comprising $H_2SO_4$.

Stage ii-1)

The alkaline aqueous solution can be an aqueous solution of an alkali metal or alkaline earth metal hydroxide or an aqueous solution of an alkali metal or alkaline earth metal carbonate. Preferably, the alkaline aqueous solution is chosen from an aqueous solution of sodium hydroxide, of potassium hydroxide, of calcium hydroxide, of magnesium hydroxide, of calcium carbonate, of potassium carbonate, and their mixtures.

Stage ii-1) can be carried out in a reactor and preferably in a stirred reactor.

According to one embodiment, stage ii-1) makes it possible to form and to recover:

a gas stream G3 comprising water and optionally one or more inert gas(es), and an alkaline stream L3 comprising water, chloride ions and sulfate $SO_4^{2-}$ ions, said stream L3 preferably being a liquid stream.

The alkaline stream L3 can optionally be directed to a waste water treatment plant, before optional discharge to the environment.

Stage ii-2)

According to one embodiment, stage a) of treatment of the gas stream F2 comprises ii) bringing the gas stream F2 into contact with a hydrogen peroxide solution, followed by a stage ii-2) of separation of HCl and of $H_2SO_4$ contained in the stream L2 in order to form and to recover a stream F3 comprising HCl and a stream F'3 comprising $H_2SO_4$.

The separation can be a separation by distillation or by electrodialysis.

According to one embodiment, when stage ii-2) is a separation by electrodialysis, it makes it possible to form and to recover a liquid stream F3 comprising HCl and a liquid stream F'3 comprising $H_2SO_4$.

The stream F'3 is preferably a concentrated aqueous $H_2SO_4$ solution, preferably comprising a content by weight of $H_2SO_4$ of greater than or equal to 20%, preferably of greater than or equal to 50%.

The stream F3 comprises:

more than 5% by weight of HCl, preferentially more than 10% by weight of HCl; and less than 10% by weight of $H_2SO_4$, preferentially less than 5% by weight.

The stream F3 can optionally be directed to a waste water treatment plant, before optional discharge to the environment.

The distillation can be carried out in at least one distillation column.

The separation stage advantageously makes it possible to separate HCl and $H_2SO_4$ contained in the stream L2.

According to one embodiment, when stage ii-2) is a separation by distillation, it makes it possible to form and to recover a stream F3 comprising HCl, preferably at the distillation column top, and a liquid stream F'3 comprising $H_2SO_4$.

The stream F3 can be a gas stream or a liquid stream.

Preferably, the stream F3 comprises:

at least 15% by weight of HCl, preferably at least 20% by weight, with respect to the total weight of said stream F3; and/or less than 5000 ppm of $H_2SO_4$, preferably less than 1000 ppm of $H_2SO_4$ and advantageously less than 500 ppm of $H_2SO_4$.

The stream F'3 is preferably a concentrated aqueous $H_2SO_4$ solution, preferably comprising a content by weight of $H_2SO_4$ of greater than or equal to 20%, preferably of greater than or equal to 50%.

The stream F3 can optionally be subjected to a concentration or dilution stage. It can be sold and/or recycled in said process.

When the stream F3 is gaseous, it can be sold, and/or used as starting material in another process, and/or subjected to a stage of absorption of the hydrochloric acid contained in said stream F3 in an aqueous solution, said aqueous solution preferably being demineralized water, making it possible to form and to recover a hydrochloric acid solution. The concentration by weight of HCl in the hydrochloric acid solution can be from 5% to 50%, preferably from 15% to 40% and more particularly from 30% to 35% by weight. The hydrochloric acid solution obtained can advantageously be given an economic value commercially.

When the stream F3 is liquid, it can be subjected to a concentration or dilution stage, for example in order to obtain a 33% by weight hydrochloric acid solution, which can advantageously be given an economic value commercially.

Treatment: Separation of the Gases

According to a third embodiment, stage a) of treatment of the gas stream F2 comprises:

iii) an optional stage of compression of said gas stream F2,
iv) a stage of separation of HCl and $SO_2$ contained in said gas stream F2 resulting in a stream G4, preferably a gas stream, comprising HCl and in a stream F4 comprising $SO_2$, it being possible for said stream F4 to be a liquid or gas stream.

The gas stream G4 can optionally comprise one or more inert gas(es), such as, for example, nitrogen.

The abovementioned compression stage iii) can make it possible to compress the gas stream F2 to a pressure of greater than 5 bar abs, preferably of greater than 7 bar abs, and preferentially of greater than 10 bar abs, and more advantageously still of greater than 15 bar abs, for example greater than 20 bar abs.

The abovementioned separation stage iv) can be a distillation or a membrane separation.

When the separation stage iv) is a membrane separation, it advantageously results in a gas stream G4 comprising HCl and in a gas stream F4 comprising $SO_2$.

A membrane separation stage typically comprises the use of one or more membranes. When several membranes are used, they can be arranged in series or in a cluster.

According to one embodiment, stage iv) is a membrane separation carried out with one or more membrane(s).

The membrane(s) can be inorganic (for example ceramic or glass), organic (for example polymeric) or a mixture of the two.

Preferably, the membrane separation stage is carried out with at least one polymeric membrane, for example based on PVDF, polyamide or polyimide, or on their mixtures.

When the separation stage iv) is a membrane separation, it advantageously results in a gas stream G4 comprising purified HCl and in a gas stream F4 (denoted $F4_g$) comprising purified $SO_2$.

According to a preferred embodiment, stage iv) is a distillation carried out in at least one distillation column.

The distillation column can comprise at least 8 theoretical stages, preferably at least 10 theoretical stages, advantageously at least 12 theoretical stages.

The molar reflux ratio can be at least 1.5, preferably at least 3 and advantageously at least 4.

The separation by distillation can be carried out:

at a temperature at the distillation column bottom ranging from 40° C. to 80° C., preferably from 40° C. to 60° C. and preferentially from 50° C. to 60° C., at a pressure of 10 bar abs; or at a temperature at the distillation column bottom ranging from 40° C. to 100° C., preferably from 50° C. to 90° C. and preferentially from 60° C. to 80° C., at a pressure of 14 bar abs.

The distillation column can comprise:

at least one packing, such as, for example, a random packing and/or a stacked packing, and/or trays, such as, for example, perforated trays, fixed valve trays, movable valve trays, bubble cap trays or their combinations.

When the separation stage iv) is a distillation, it advantageously results in a gas stream G4 comprising HCl and in a liquid stream F4 comprising $SO_2$. The gas stream G4 advantageously comprises purified HCl, preferably recovered at the distillation column top, and the liquid stream F4 advantageously comprises purified $SO_2$, preferably recovered at the distillation column bottom.

The liquid stream F4 obtained on conclusion of the stage of separation iv) by distillation can optionally be subjected to an additional vaporization stage to result in a gas stream.

According to one embodiment, stage a) of treatment of the gas stream F2 comprises:

iii) an optional stage of compression of said gas stream F2,
iv) a stage of separation of HCl and $SO_2$ contained in said gas stream F2 resulting in a stream G4, preferably a gas stream, comprising HCl and in a stream F4 comprising $SO_2$, it being possible for said stream F4 to be a liquid or gas stream, and an additional stage v) of treatment of the gas stream G4 and/or an additional stage vi) of treatment of the stream F4.

Stream G4

The gas stream G4 obtained on conclusion of stage iv) advantageously comprises less than 100 ppm of $SO_2$, preferably less than 80 ppm of $SO_2$ and preferentially less than 50 ppm of $SO_2$.

In the context of the invention, "ppm" are "parts per million", expressed by weight.

The gas stream G4 obtained on conclusion of stage iv) can advantageously be:

sold directly, and/or used as starting material in another process; and/or subjected to an additional treatment stage v).

According to one embodiment, stage a) of treatment of the gas stream F2 comprises:

iii) an optional stage of compression of said gas stream F2, iv) a stage of separation of the gas stream F2 resulting in a stream G4, preferably a gas stream, comprising HCl and in a stream F4 comprising $SO_2$, it being possible for said stream F4 to be a liquid or gas stream, v) an additional stage of treatment of the gas stream G4, said stage v) comprising:
   a v-1) an optional stage of purification of said gas stream G4,
   v-2) a stage of absorption of the hydrochloric acid contained in said gas stream G4 in an aqueous solution, said aqueous solution preferably being demineralized water, making it possible to form and to recover an aqueous hydrochloric acid solution L5, vi) an optional stage of treatment of the stream F4.

Stage v-1) is preferably a stage of absorption of impurities with at least one solid adsorber, such as, for example, activated carbon or alumina. The gas flow G4 obtained on conclusion of stage v-1) can advantageously be sold, and/or used as starting material in another process, and/or subjected to the abovementioned stage v-2).

The purification stage v-1) advantageously makes it possible to reduce the residual $SO_2$ content, for example to a content of less than 50 ppm, preferably of less than 20 ppm and advantageously of less than 10 ppm, in the purified gas stream G4.

The abovementioned stage v-2) advantageously makes it possible to collect an aqueous hydrochloric acid solution L5 and a gas stream G5 comprising water and optionally one or more inert gas(es).

The concentration by weight of HCl in the aqueous hydrochloric acid solution L5 can be from 5% to 50%, preferably from 15% to 40% and more particularly from 30% to 35% by weight.

The solution L5 can advantageously be given an economic value commercially.

Stream F4

The stream F4 advantageously comprises less than 100 ppm of HCl, preferably less than 80 ppm and preferentially less than 50 ppm of HCl.

The liquid or gas stream F4 obtained on conclusion of stage iv) can advantageously be subjected to an additional treatment stage vi).

In the case where the stream F4 is a liquid stream, in particular when stage iv) is a separation by distillation, the treatment stage vi) comprises vi-1) bringing said liquid stream F4 into contact with an alkaline aqueous solution.

The alkaline aqueous solution can be an aqueous solution of an alkali metal or alkaline earth metal hydroxide or an aqueous solution of an alkali metal or alkaline earth metal carbonate. Preferably, the alkaline aqueous solution is chosen from an aqueous solution of sodium hydroxide, of potassium hydroxide, of calcium hydroxide, of magnesium hydroxide, of calcium carbonate, of potassium carbonate, and their mixtures.

The contacting operation vi-1) can be carried out in a reactor and preferably in a stirred reactor.

The abovementioned contacting operation vi-1) can result in a gas stream G6 comprising water and optionally one or more inert gas(es) and in an alkaline stream L6 comprising water, chloride ions and sulfite ions, said stream L6 preferably being a liquid stream.

The alkaline stream L6 can optionally be directed to a waste water treatment plant, before optional discharge to the environment.

In the case where the stream F4 is a gas stream, in particular when stage iv) is a membrane separation or when the liquid stream F4 obtained in the distillation stage iv) has been subjected to a vaporization stage, the treatment stage vi) comprises:
   vi-2) bringing said gas stream F4 into contact with an alkaline aqueous solution; or
   vi-3) bringing the gas stream F4 into contact with a hydrogen peroxide solution; or
   vi-4) the oxidation, preferably catalytic or electrochemical, of the gas stream F4 in the presence of oxygen in order to form a stream F5 comprising $SO_3$, optionally followed;
      by a stage vi-4-a) of absorption of $SO_3$ contained in said stream F5 in a concentrated sulfuric acid solution, making it possible to form and to recover a gas stream G9, comprising water and optionally one or more inert gas(es), and an oleum L9;
      then optionally a stage vi-4-b) of dilution of the oleum L9 in water, in order to form an aqueous solution L10.

Preferably, the alkaline aqueous solution of stage vi-2) can be an aqueous solution of an alkali metal or alkaline earth metal hydroxide or an aqueous solution of an alkali metal or alkaline earth metal carbonate. Preferably, the alkaline aqueous solution is chosen from an aqueous solution of sodium hydroxide, of potassium hydroxide, of calcium hydroxide, of magnesium hydroxide, of calcium carbonate, of potassium carbonate, and their mixtures.

Preferably, the contacting operation vi-2) is carried out in a neutralization column, in particular operating countercurrentwise.

The neutralization column can comprise:
at least one packing, such as, for example, a random packing and/or a stacked packing,
and/or
trays, such as, for example, perforated trays, fixed valve trays, movable valve trays, bubble cap trays or their combinations.

According to one embodiment, the gas stream F4 is introduced at the bottom of the neutralization column, while the alkaline aqueous solution is introduced at the top of said column.

According to one embodiment, stage vi-2) of bringing the gas stream F4 into contact, in particular in a neutralization column, with an alkaline aqueous solution makes it possible to form and to recover:
a gas stream G7 comprising water and optionally one or more inert gas(es), preferably recovered at the neutralization column top; and
an alkaline stream L7 comprising water, Cl⁻ ions and sulfite ions, preferably recovered at the neutralization column bottom, said stream L8 preferably being a liquid stream.

The stream L7 can optionally be directed to a waste water treatment plant, before optional discharge to the environment.

Preferably, the abovementioned stage vi-3) is carried out in a scrubbing column, in particular operating countercurrentwise.

The scrubbing column can comprise:
at least one packing, such as, for example, a random packing and/or a stacked packing,
and/or
trays, such as, for example, perforated trays, fixed valve trays, movable valve trays, bubble cap trays or their combinations.

According to one embodiment, the gas stream F4 is introduced at the bottom of the scrubbing column, while the hydrogen peroxide solution is introduced at the top of said column.

The hydrogen peroxide solution can be an aqueous solution, the content by weight of hydrogen peroxide of which ranges from 5% to 70% by weight, preferably from 5% to 50% by weight and advantageously from 5% to 35% by weight.

The molar ratio of hydrogen peroxide/$SO_2$ contained in the gas stream F4 can range from 1 to 25, preferably from 1 to 20 and preferentially from 1 to 15.

According to one embodiment, stage vi-3) of bringing the gas stream F4 into contact, in particular in a scrubbing column, with a hydrogen peroxide solution makes it possible to form and to recover:
a gas stream G8 comprising water and optionally one or more inert gas(es), preferably recovered at the scrubbing column top; and
a stream L8 comprising water and $H_2SO_4$, preferably recovered at the scrubbing column bottom, said stream L8 preferably being a liquid stream.

The concentration by weight of $H_2SO_4$ in the aqueous stream L8 can be greater than or equal to 5%, preferably greater than or equal to 10% and advantageously greater than or equal to 20%. The stream L8 can optionally be subjected to a concentration stage.

The stream L8 can advantageously be sold and/or recycled in the abovementioned chlorination stage.

Preferably, the abovementioned stage vi-4) is carried out in a reactor.

The concentrated sulfuric acid solution used in stage vi-4-a) is preferably a solution having more than 95% by weight of $H_2SO_4$.

The oleum L9 obtained on conclusion of the abovementioned stage vi-4-a) can be directly sold, and/or subjected to an optional stage vi-4-b) of dilution of the oleum L9 in water, in order to form an aqueous solution L10. The solution L10 is advantageously a sulfuric acid solution which can be sold, and/or recycled in the process, for example to the abovementioned chlorination stage and/or to stage vi-4-a).

Treatment: Selective Absorption of HCl or $SO_2$

According to a fourth embodiment, stage a) of treatment of the gas stream F2 comprises:
vii) a stage of absorption of the hydrochloric acid contained in said gas stream F2 in an aqueous solution, said aqueous solution preferably being demineralized water, making it possible to form and to recover a hydrochloric acid solution L11 and a gas stream G11 comprising $SO_2$, water and optionally one or more inert gases;
or
x) a stage of absorption of $SO_2$ contained in said gas stream F2 in a concentrated sulfuric acid solution, making it possible to form and to recover a gas stream G12 comprising HCl and optionally one or more inert gas(es) and a stream L12 comprising water, $H_2SO_4$ and $SO_2$, said stream L12 preferably being a liquid stream.

The absorption stage vii) can be carried out in a column, the gas stream G11 preferably being recovered at the column top, while the solution L11 preferably being recovered at the column bottom.

The concentration by weight of HCl in the hydrochloric acid solution L11 can be from 5% to 50%, preferably from 15% to 40% and more particularly from 30% to 35%.

The solution L11 can optionally comprise $SO_2$ in a content by weight of less than or equal to 100 ppm, preferably of less than or equal to 50 ppm, advantageously of less than or equal to 20 ppm.

Stage a) of treatment of the gas stream F2 can comprise a stage viii), subsequent to stage vii), comprising the purification of the solution L11, preferably by adsorption of residual impurities with at least one solid adsorber, such as, for example, activated carbon or a silica gel. After this additional stage of adsorption on silica gel or activated carbon, it is advantageously possible to achieve $SO_2$ contents of less than 1 ppm in the HCl solution.

The optionally purified solution L11 can advantageously be given an economic value commercially.

The abovementioned stage vii) advantageously makes it possible to collect a hydrochloric acid solution L11 and a gas stream G11 comprising $SO_2$, water and optionally one or more inert gas(es).

According to one embodiment, at least 95% by weight, preferably at least 99% by weight, advantageously at least 99.5% by weight and preferentially at least 99.9% by weight of HCl contained in the gas stream F2 is recovered in the liquid stream L11.

According to one embodiment, at least 95% by weight, preferably at least 99% by weight, advantageously at least 99.5% by weight and preferentially at least 99.9% by weight of $SO_2$ contained in the gas stream F2 is recovered in the gas stream G11.

Stage a) of treatment of the gas stream F2 can also comprise a stage ix) of drying the gas stream G11, for example carried out in the presence of calcium sulfate, sodium sulfate, magnesium sulfate, calcium chloride, calcium carbonate, silica gel or molecular sieve.

The optionally dried gas stream G11 can be subjected to one of stages vi-2), vi-3) or vi-4) as defined above.

According to one embodiment, stage a) of treatment of the gas stream F2 comprises:
x) a stage of absorption of $SO_2$ contained in said gas stream F2 in a concentrated sulfuric acid solution, making it possible to form and to recover a gas stream G12 comprising HCl and optionally one or more inert gas(es) and a stream L12 comprising water, $H_2SO_4$ and $SO_2$, said stream L12 preferably being a liquid stream.

The concentrated sulfuric acid solution used in stage x) is preferably a solution having more than 95% by weight of $H_2SO_4$.

The absorption stage x) can be carried out in a column, the gas stream G12 preferably being recovered at the column top, while the solution L12 preferably being recovered at the column bottom.

The gas stream G12 comprises more than 50% by weight of HCl, preferably more than 80% by weight of HCl and advantageously more than 90% by weight of HCl, with respect to the total weight of said stream G12.

The gas stream G12 can advantageously be sold directly, and/or be subjected to a stage of giving an economic value in order to form a commercial 33% HCl solution (it can, for example, be a stage similar to stage vii) above).

According to one embodiment, at least 95% by weight, preferably at least 99% by weight, advantageously at least 99.5% by weight and preferentially at least 99.9% by weight of HCl contained in the gas stream F2 is recovered in the gas stream G12.

According to one embodiment, at least 95% by weight, preferably at least 99% by weight, advantageously at least 99.5% by weight and preferentially at least 99.9% by weight of $SO_2$ contained in the gas stream F2 are recovered in the stream L12.

The stream L12 can optionally:
be subjected, at least partially, to a heating stage, making it possible to form and to recover a gas stream G13 comprising $SO_2$ and a stream L13 comprising $H_2SO_4$. The gas stream G13 can advantageously be recycled to any stage of the process comprising gaseous $SO_2$, for example reused in any one of the abovementioned stages vi-2), vi-3) or vi-4);
and/or
be subjected, at least partially, to a stage of bringing into contact with a hydrogen peroxide solution, preferably in a stirred reactor.

Preferably, the stage of bringing the stream L12 into contact, in particular in a stirred reactor, with a hydrogen peroxide solution makes it possible to form and to recover:
a gas stream G14 comprising water and optionally one or more inert gas(es), and
a stream L14 comprising water and $H_2SO_4$, said stream L14 preferably being a liquid stream.

The concentration by weight of $H_2SO_4$ in the aqueous stream L14 can be greater than or equal to 5%, preferably greater than or equal to 10% and advantageously greater than or equal to 20%. The stream L14 can optionally be subjected to a concentration stage.

The stream L14 can advantageously be sold and/or recycled in the abovementioned chlorination stage.

Chlorination Stage

The chlorination stage according to the invention can be carried out:
at a temperature of between 30° C. and 150° C.; and/or
with a reaction time of between 1 hour and 7 days; and/or
at a pressure of between 1 bar abs and 20 bar abs.

According to the invention, the sulfur-containing agent can be chosen from the group consisting of chlorosulfonic acid ($ClSO_3H$), sulfuric acid, oleum and their mixtures.

According to the invention, the chlorinating agent can be chosen from the group consisting of thionyl chloride ($SOCl_2$), oxalyl chloride ($COCl)_2$, phosphorus pentachloride ($PCl_5$), phosphoryl trichloride ($PCl_3$), phosphoryl trichloride ($POCl_3$) and their mixtures. Preferably, the chlorinating agent is thionyl chloride.

The chlorination stage can be carried out in the presence of a catalyst, such as, for example, chosen from a tertiary amine (such as methylamine, triethylamine or diethylmethylamine); pyridine; and 2,6-lutidine.

The molar ratio of the sulfur-containing acid to the sulfamic acid can be between 0.7 and 5, preferably between 0.9 and 5.

The molar ratio of the chlorinating agent to the sulfamic acid can be between 2 and 10, preferably between 2 and 5.

In particular, when the sulfur-containing agent is chlorosulfonic acid, the molar ratio of the latter to the sulfamic acid is between 0.9 and 5 and/or the molar ratio of the chlorinating agent to the sulfamic acid is between 2 and 5.

In particular, when the sulfur-containing agent is sulfuric acid (or oleum), the molar ratio of the sulfuric acid (or oleum) to the sulfamic acid is between 0.7 and 5.

In particular, when the sulfur-containing agent is sulfuric acid (or oleum), the molar ratio of the sulfuric acid (or oleum) to the sulfamic acid is between 0.9 and 5 and/or the molar ratio of the chlorinating agent to the sulfamic acid is between 2 and 10.

Process for the Preparation of LiFSI

The present invention also relates to a process for the preparation of the lithium salt of bis(fluorosulfonyl)imide (LiFSI) comprising the abovementioned process for the preparation of Cl—$SO_2$—NH—$SO_2$—Cl.

According to one embodiment, the process for the preparation of the lithium salt of bis(fluorosulfonyl)imide comprises the following stages:
i. process for the preparation of bis(chlorosulfonyl)imide from sulfamic acid, as described above;
ii. fluorination of bis(chlorosulfonyl)imide to give bis(fluorosulfonyl)imide;
iii. preparation of the alkali metal or alkaline earth metal salt of bis(fluorosulfonyl)imide by neutralization of bis(fluorosulfonyl)imide, in particular using an aqueous solution of a base chosen from alkali metal or alkaline earth metal carbonates and alkali metal or alkaline earth metal hydroxides;
iv. optionally cation exchange in order to obtain a lithium bis(fluorosulfonyl)imide salt; and
v. process for drying and purifying the lithium bis(fluorosulfonyl)imide salt.

The process for the preparation of lithium bis(fluorosulfonyl)imide salt according to the invention advantageously makes it possible to avoid the discharge of HCl and $SO_2$ to the atmosphere. The process is thus advantageously less polluting and more environmentally friendly.

In addition, the process for the preparation of lithium bis(fluorosulfonyl)imide salt according to the invention advantageously makes it possible to give an economic value to certain secondary streams formed during the preparation of said LiFSI, which improves the economic profitability of the process.

The following examples make it possible to illustrate the present invention without, however, limiting it.

EXAMPLES

Example 1

A 100-liter enamelled steel reactor equipped with a stirrer is charged with sulfamic acid (1 eq, 257.5 mol, 25 kg) and 95% sulfuric acid (1 eq, 257.5 mol, 26.6 kg). Thionyl chloride (4 eq, 1030 mol, 122.5 kg) is gradually added to the reactor. The temperature of the reaction medium is gradually increased up to 75° C. The reaction is carried out at atmospheric pressure.
Total conversion to sulfamic acid is obtained after 60 hours. A condenser is positioned on the vent line of the reactor so as to condense the vaporized thionyl chloride and to reflux it into the reaction medium.
At the end of the reaction, 67 kg of liquid containing bis(chlorosulfonyl)imide and unreacted thionyl chloride is obtained.
The gases generated by the reaction (HCl and $SO_2$) and not condensed by the condenser are directed to a system which makes it possible to absorb them (cf. examples 2 and 3).

Example 2

HCl and $SO_2$ Absorption in an $H_2O_2$ Solution

The gases generated by the reaction of example 1 are sent to a storage tank containing 700 kg of a 5% by weight $H_2O_2$ solution. This storage tank is surmounted by a packed column sprayed at the top with the $H_2O_2$ solution contained in said storage tank. A pump makes it possible to withdraw the $H_2O_2$ solution from the storage tank in order to spray the column. The gases generated by the reaction (HCl and $SO_2$) are introduced the $H_2O_2$ solution contained in the storage tank by means of a dip pipe. The HCl and the $SO_2$ are absorbed in the $H_2O_2$ solution and the $SO_2$ reacts with $H_2O_2$ to form $H_2SO_4$. The packed column makes it possible to finalize the absorption of the gases generated by the reaction, HCl and $SO_2$, and to completely convert the $SO_2$ into $H_2SO_4$.

At the end of the reaction, a solution of 797 kg is obtained comprising 1% by weight of $H_2O_2$, 5% by weight of HCl and 10% by weight of $H_2SO_4$.

Example 3

HCl Absorption in Water Followed by $SO_2$ Absorption in an $H_2O_2$ Solution

The gases generated by the reaction of example 1 (HCl and $SO_2$) are directed to an HCl absorption column sprayed with water at the top. This column makes it possible to obtain a 33% HCl solution at the bottom. This column makes it possible to specifically absorb gaseous HCl, while gaseous $SO_2$ is not absorbed.

The gaseous $SO_2$ is recovered at the top of the HCl absorption column and is directed to a storage tank containing 300 kg of a 10% by weight $H_2O_2$ solution of a solution. The device for absorption of gaseous $SO_2$ in an $H_2O_2$ solution is identical to that described in example 2. In this configuration, the packed column makes it possible to finalize the absorption of $SO_2$ and to completely convert the $SO_2$ into $H_2SO_4$.

At the end of the reaction, 130 kg of a 33% HCl solution, on the one hand, and a solution of 354 kg comprising less than 1% by weight of $H_2O_2$ and 23% by weight of $H_2SO_4$, on the other hand, are obtained.

The invention claimed is:

1. A process for the preparation of Cl—$SO_2$NH$SO_2$Cl comprising a stage of chlorination of sulfamic acid with at least one chlorinating agent and at least one sulfur-containing agent, said process resulting in a stream F1 comprising Cl—$SO_2$NH$SO_2$Cl and a gas stream F2 comprising HCl and $SO_2$, said process comprising a stage a) of treatment of the gas stream F2.

2. The process as claimed in claim 1, in which stage a) of treatment of the gas stream F2 comprises a stage of bringing said stream F2 into contact with an alkaline aqueous solution, and/or a stage of bringing said stream F2 into contact with a hydrogen peroxide solution, and/or a stage of separation of HCl and $SO_2$ contained in said stream F2, and/or a stage of absorption of HCl contained in said gas stream F2 in an aqueous solution, and/or a stage of absorption of $SO_2$ contained in said gas stream F2 in a concentrated sulfuric acid solution.

3. The process as claimed in claim 1, in which the gas stream F2 comprises:
more than 20% by weight of HCl, with respect to the total weight of said stream F2; and/or
more than 30% by weight of $SO_2$, with respect to the total weight of said stream F2.

4. The process as claimed in claim 1, in which stage a) of treatment of the gas stream F2 comprises i) bringing the gas stream F2 into contact with an alkaline aqueous solution.

5. The process as claimed in claim 1, in which stage a) of treatment of the gas stream F2 comprises ii) bringing the gas stream F2 into contact with a hydrogen peroxide solution.

6. The process as claimed in claim 5, in which stage ii) of bringing the gas stream F2 into contact with a hydrogen peroxide solution makes it possible to form and to recover:
a gas stream G2 comprising water and optionally one or more inert gas(es); and
an acid stream L2 comprising water, HCl and $H_2SO_4$.

7. The process as claimed in claim 6, comprising an additional stage ii-1) of treatment of the stream L2 which comprises bringing said stream L2 into contact with an alkaline aqueous solution, or an additional stage ii-2) of separation of HCl and of $H_2SO_4$ contained in the stream L2 in order to form and to recover a stream F3 comprising HCl and a stream F'3 comprising $H_2SO_4$.

8. The process as claimed in claim 1, in which stage a) of treatment of the gas stream F2 comprises:
iii) an optional stage of compression of said gas stream F2,
iv) a stage of separation of HCl and $SO_2$ contained in said gas stream F2 resulting in a stream G4 comprising HCl and in a stream F4 comprising $SO_2$, it being possible for said stream F4 to be a liquid or gas stream.

9. The process as claimed in claim 8, in which stage a) comprises an additional stage v) of treatment of the gas stream G4, and/or an additional stage vi) of treatment of the stream F4.

10. The process as claimed in claim 9, in which said stage v) comprises:
v-1) an optional stage of purification of said gas stream G4,
v-2) a stage of absorption of the hydrochloric acid contained in said gas stream G4 in an aqueous solution, making it possible to form and to recover an aqueous hydrochloric acid solution L5.

11. The process as claimed in claim 9, in which:
when the stream F4 is a liquid stream, in particular when stage iv) is a separation by distillation, the treatment stage vi) comprises vi-1) bringing said liquid stream F4 into contact with an alkaline aqueous solution, resulting in a gas stream G6 comprising water and optionally one or more inert gas(es) and in an alkaline stream L6 comprising water, chloride ions and sulfite ions;
when the stream F4 is a gas stream, the treatment stage vi) comprises:
vi-2) bringing said gas stream F4 into contact with an alkaline aqueous solution;
or
vi-3) bringing the gas stream F4 into contact with a hydrogen peroxide solution;
or
vi-4) the oxidation of the gas stream F4 in the presence of oxygen in order to form a stream F5 comprising $SO_3$, optionally followed;
by a stage vi-4-*a*) of absorption of $SO_3$ contained in said stream F5 in a concentrated sulfuric acid solution, making it possible to form and to recover a gas stream G9, comprising water and optionally one or more inert gas(es), and an oleum L9;
then optionally a stage vi-4-*b*) of dilution of the oleum L9 in water, in order to form an aqueous solution L10.

12. The process as claimed in claim 1, in which stage a) of treatment of the gas stream F2 comprises:
vii) a stage of absorption of the hydrochloric acid contained in said gas stream F2 in an aqueous solution, making it possible to form and to recover a hydrochloric acid solution L11 and a gas stream G11 comprising $SO_2$, water and optionally one or more inert gases;
or
x) a stage of absorption of $SO_2$ contained in said gas stream F2 in a concentrated sulfuric acid solution, making it possible to form and to recover a gas stream G12 comprising HCl and optionally one or more inert gas(es) and a stream L12 comprising water, $H_2SO_4$ and $SO_2$.

13. The process as claimed in claim 12, in stage a) of treatment of the gas stream F2 comprises:
a stage viii), subsequent to stage vii), comprising the purification of the solution L11; and
an optional stage ix) of drying the gas stream G11, for example carried out in the presence of calcium sulfate, sodium sulfate, magnesium sulfate, calcium chloride, calcium carbonate, silica gel or molecular sieve.

14. The process as claimed in claim 12, in which stream L12 is:
subjected, at least partially, to a heating stage, making it possible to form and to recover a gas stream G13 comprising $SO_2$ and a stream L13 comprising $H_2SO_4$; and/or
subjected, at least partially, to a stage of bringing into contact with a hydrogen peroxide solution.

15. The process as claimed in claim 1, in which the chlorination stage is carried out:
at a temperature of between 30° C. and 150° C.; and/or
with a reaction time of between 1 hour and 7 days; and/or
at a pressure of between 1 bar abs and 20 bar abs.

16. The process as claimed in claim 1, in which:
the sulfur-containing agent is chosen from the group consisting of chlorosulfonic acid ($ClSO_3H$), sulfuric acid, oleum and their mixtures; and/or
the chlorinating agent is chosen from the group consisting of thionyl chloride ($SOCl_2$), oxalyl chloride ($COCl)_2$, phosphorus pentachloride ($PCl_5$), phosphonyl trichloride ($PCl_3$), phosphoryl trichloride ($POCl_3$) and their mixtures.

17. A process for the preparation of the lithium salt of bis(fluorosulfonyl)imide comprising the process for the preparation of Cl—$SO_2$—NH—$SO_2$—Cl as defined according to claim 1.

* * * * *